(12) United States Patent
Shi et al.

(10) Patent No.: US 9,964,717 B2
(45) Date of Patent: May 8, 2018

(54) DEVICE AND METHOD FOR ALIGNING AND BONDING LENS ARRAY AND PD ARRAY WITH HIGH PRECISION

(71) Applicant: Accelink Technologies Co., Ltd., Wuhan (CN)

(72) Inventors: Chuan Shi, Wuhan (CN); Huali Xi, Wuhan (CN); Xiong Jiang, Wuhan (CN); Xuerui Liang, Wuhan (CN); Hualin Yin, Wuhan (CN); Weidong Ma, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 0 days. days.

(21) Appl. No.: 15/534,863

(22) PCT Filed: Dec. 17, 2014

(86) PCT No.: PCT/CN2014/094079
§ 371 (c)(1),
(2) Date: Jun. 9, 2017

(87) PCT Pub. No.: WO2016/090661
PCT Pub. Date: Jun. 16, 2016

(65) Prior Publication Data
US 2017/0343748 A1    Nov. 30, 2017

(30) Foreign Application Priority Data

Dec. 11, 2014    (CN) .......................... 2014 1 0763969

(51) Int. Cl.
*G02B 6/42*    (2006.01)

(52) U.S. Cl.
CPC ......... *G02B 6/4221* (2013.01); *G02B 6/4206* (2013.01); *G02B 6/4227* (2013.01); *G02B 6/4239* (2013.01)

(58) Field of Classification Search
CPC ... G02B 6/4269; G02B 6/4214; G02B 6/4206
See application file for complete search history.

(56) References Cited

U.S. PATENT DOCUMENTS

2016/0231522 A1*    8/2016   Shi ........................... G02B 6/43

FOREIGN PATENT DOCUMENTS

| CN | 101867158 A | 10/2010 |
|---|---|---|
| CN | 201967306 U | 9/2011 |

(Continued)

OTHER PUBLICATIONS

International Search Report for Application No. PCT/CN2014/094079, dated Sep. 21, 2015.

*Primary Examiner* — Sung Pak
*Assistant Examiner* — Hoang Tran
(74) *Attorney, Agent, or Firm* — Lerner, David, Littenberg, Krumholz & Mentlik, LLP (57) ABSTRACT

Device and method are provided to align and bond a lens array to a PD array with high precision, which can implement aligning and bonding of the lens array automatically. A telescopic rod of the stepping actuator is adjusted until photosensitive areas of the PD array form a clear image on the image acquisition CCD through the lens array, an adjusted distance h1 of the telescopic rod is recorded, and a position coordinate (xn, yn) of center of each circular photosensitive area in the image may be obtained, and a slope k1 of a line connecting the centers of the photosensitive areas is calculated. The telescopic rod is adjusted again, and a slope k2 of a line connecting the centers of the apertures of the lens array is calculated. Based on calculated values Δxn, Δyn, arctan(k1)−arctan(k2), the high-resolution adjustment stage is adjusted to adjust position of the lens array.

9 Claims, 4 Drawing Sheets

(56) References Cited

FOREIGN PATENT DOCUMENTS

| | | |
|---|---|---|
| CN | 102854594 A | 1/2013 |
| CN | 102866471 A | 1/2013 |
| CN | 103513348 A | 1/2014 |
| JP | 2000114281 A | 4/2000 |
| JP | 2001313303 A | 11/2001 |

* cited by examiner

DEVICE AND METHOD FOR ALIGNING AND BONDING LENS ARRAY AND PD ARRAY WITH HIGH PRECISION

CROSS REFERENCE TO RELATED APPLICATIONS

The present application is a national phase entry under 35 U.S.C. § 371 of International Application No. PCT/CN2014/094079, filed Dec. 17, 2014, which claims priority from Chinese Patent Application No. 201410763969.4 filed Dec. 11, 2014, all of which are hereby incorporated herein by reference.

FIELD OF THE INVENTION

The present invention belongs to the field of optical communication, and it relates to the photoelectric module in the optical communication technique. More particularly, the present invention relates to device and method for aligning and bonding a lens array with a photodiode (PD) or laser array.

BACKGROUND OF THE INVENTION

Automatic image processing techniques have been widely applied in various industries, from automatic reading and tracking of bar codes in a production line, automatic recognition of an vehicle license plate, automatic defect detection of components, DVD recognition and automatic return, to directing a robot hand to assemble apparatus and the like, in which the image processing techniques play an important role. As the image processing techniques are highly intelligent and stable, and have good repeatability and high precision, they can be used to replace human to do intensive repetitive work. Because of such features, the image processing techniques have been introduced into the field of communication and to photoelectric products. Communication products include many photoelectric products that in common utilize conversion of light to electricity or electricity to light, most of which need lenses to focus light beams. In such products, it is important to ensure alignment between centers of the lens and the PD or laser.

In a patent application No. 201310433022.2 entitled "optical waveguide chip and PD array lens coupling device", a lens array is used in a coupling structure of the waveguide chip and the PD array. This patent uses a die bonder to achieve alignment of the lens array and the PD array. In the bonding operation, the operator determines whether the lens array center and the PD array photosensitive area center are coincided with each other by his/her eyes. This method may have large artificial error in deciding centers of the lens array and the PD array, and have poor repeatability. And, if a high speed PD array is used which has a photosensitive area of only several tens of micrometers, error in determining alignment of centers would be larger. In addition, the die bonder of high precision is expensive, and maintenance cost thereof is also very high.

SUMMARY OF THE INVENTION

An object of the present invention is to overcome problems and deficiencies in the prior arts by providing an aligning bonding device and an aligning method that utilize image processing to align and bond a lens to a PD or laser. The present invention can implement automatic alignment in bonding (adhering) of the lens.

The present invention may be implemented as follows.

An aligning bonding device for aligning a lens array and a PD array with high precision comprising a cassette holding fixture, a lens array holding fixture, a gantry, a securing frame, an image acquisition CCD, a high-resolution adjustment stage, a first bubble level, a second bubble level, a third bubble level, a slide, a slide platform, an one-axis linear stage, a connecting plate, a transition block, and a stepping actuator; wherein the high-resolution adjustment stage is fixed to a pedestal of the gantry, the transition block is fixed on the high-resolution adjustment stage, the first bubble level is provided on the transition block, the securing frame is fixed on the gantry, the slide is provided in the securing frame and is embedded into the slide platform, the one-axis linear stage is provided on the slide platform, the image acquisition CCD has its rear surface fixed on the connecting plate, the connecting plate is fixed on the one-axis linear stage, a rear surface of the connecting plate is provided with the second bubble level, the stepping actuator is positioned below the securing frame supporting the slide platform and it can bring the slide platform to move up and down along the slide, the cassette holding fixture is positioned under the image acquisition CCD, and the third bubble level is provided on the cassette holding fixture.

The aligning bonding device further comprises a pressure sensor, one end of which is provided on the transition block, and the other end is connected to the lens array holding fixture.

A standard CCD may be further provided at a side of the cassette holding fixture to view interior of the cassette.

The lens array holding fixture has two arms including end holding parts provided with grooves.

The aligning bonding device further comprises a controller that is in communication with the pressure sensor to read a pressure voltage signal fed back from the pressure sensor.

A method for aligning a lens array and a PD array with high precision by using an aligning bonding device for aligning the lens array and the PD array with high precision comprises following steps: a lens array holding fixture holding the lens array, fixedly positioning a cassette to be aligned, in which a PD array to be aligned and a pair of glass blocks are provided, on a cassette holding fixture, adjusting an image acquisition CCD and the cassette where the PD array is provided to a completely parallel status so that the sight of the image acquisition CCD is completely perpendicular to the cassette, adjusting a high-resolution adjustment stage to make the lens array and the pair of glass blocks just be in contact with each other, determining a height dimension of the lens array, adjusting a telescopic rod of the stepping actuator connected to the image acquisition CCD to move the image acquisition CCD up and down until a photosensitive area of the PD array forms a clear image on the image acquisition CCD through the lens array, recording an adjusted distance h1 of the telescopic rod of the stepping actuator, acquiring an image and determining position coordinate of center of each circular photosensitive area of the PD array in the image, wherein a coordinate of the n-th point is recorded as (xn, yn), and calculating a slope k1 of a line connecting the centers of the photosensitive areas; adjusting the telescopic rod of the stepping actuator again until the lens array forms a clear image in the field of view of the image acquisition CCD, recording an adjusted distance h2 of the telescopic rod of the actuator, acquiring an image and determining position coordinates of centers of apertures of the lens array corresponding to the PD array, wherein a coordinate of the n-th point is recorded as (x'n, y'n), and calculating a slope k2 of a line connecting the centers of the apertures of the lens array, calculating difference between the coordinates of the centers of the photosensitive areas and the coordinates of the centers of the corresponding apertures of the lens array, wherein a coordinate difference of the n-th point is recorded as $\Delta x_n = x_n - x'_n$, $\Delta y_n = y_n - y'_n$, adjusting position of the lens array by the high-resolution adjustment stage based on the calculated values $\Delta x_n$, $\Delta y_n$, arctan(k1)−arctan(k2), repeating the above two image acquiring steps, the calculating step and the adjusting step until the following condition is satisfied: for any point n, $\Delta x_n = \Delta y_n = 0$, and k1=k2, thereby achieving coincidence of the centers of the apertures of the lens array with the centers of the photosensitive areas of the PD array.

A method for making the shooting sight of the image acquisition CCD completely perpendicular to the cassette comprises: adjusting the high-resolution adjustment stage to make the transition block, the cassette holding fixture and the connecting plate be in a horizontal status as determined through a first bubble level, a second bubble level and a third bubble level, respectively.

A method for adjusting the high-resolution adjustment stage to make the lens array and the pair of glass blocks just be in contact with each other comprises: moving the lens array to be over the PD array while observing through a standard CCD; adjusting the high-resolution adjustment stage to gradually move the lens array downwards while observing pressure value indicated on a controller for a pressure sensor installed on the lens array holding fixture, and stopping moving the lens array downwards when the pressure value changes.

The high-resolution adjustment stage may be adjusted in a manual mode or in an automatic control mode, until the centers of the apertures of the lens array are coincided with the centers of the photosensitive areas of the PD array.

The present invention has the following advantages:

1) the method of the present invention can calculate positions of the centers of the photosensitive areas of the PD array and positions of the centers of the apertures of the lens array respectively by the image processing software, obtain position difference, and provide quantized values of position difference for an operator to make decision and adjustment;

2) in the method of the present invention, the stepping actuator can move the image acquisition CCD (charge coupling element) up and down, which takes a photo of the PD array first and then a photo of the lens array, thereby solving the problem that the image acquisition CCD cannot image both the PD array and the lens array at the same time due to a short depth of field;

3) in the device of the present invention, the lens array holding fixture is fixed on the pressure sensor, and in bonding of the lens array, when the lens array is in contact with the pair of glass blocks, a counterforce is generated on the pressure sensor to make the pressure value indicated on a controller of the pressure sensor change, thus contact of the lens array with the pair of glass blocks can be determined by observing change of the pressure value indicated on the controller of the pressure sensor;

4) in the device of the present invention, the image acquisition CCD is moved up and down along the slide, and the slide ensures that the image acquisition CCD does not have a position deviation in left or right directions while moving up and down so that the two images acquired through the image acquisition CCD are consistent with each other in position;

5) in the device of the present invention, each of the cassette holding fixture and the image acquisition CCD has a bubble level attached to a rear surface thereof, which ensures that the image acquisition CCD and the cassette are in the completely parallel status, and the shooting sight of the image acquisition CCD is completely perpendicular to the cassette;

6) in the device of the present invention, the one-axis linear stage is used to move the image acquisition CCD leftwards and rightwards, which facilitates moving to a side of a first lens array to bond a second lens array after completing bonding of the first lens array in the cassette;

7) in the device of the present invention, the standard CCD observes position of the lens array with respect to the pair of glass blocks with an incline angle, which facilitates preliminary positioning of the lens array in bonding of the lens array;

8) in the device of the present invention, the lens array holding fixture includes two arms having end portions provided with grooves for positioning of the lens array to be held.

wherein

| | |
|---|---|
| 101 pressure sensor; | 102 controller; |
| 103 cassette holding fixture; | 104 lens array holding fixture; |
| 105 gantry; | 106 securing frame; |
| 107 image acquisition CCD; | 108 standard CCD; |
| 109 high-resolution adjustment stage; | 110-1 first bubble level; |
| 110-2 second bubble level; | 110-3 third bubble level; |
| 111 slide; | 112 slide platform; |
| 113 one-axis linear stage; | 114 connecting plate; |
| 115 transition block; | 116 stepping actuator; |
| 117 cassette; | 118 PD array; |
| 119 glass block; | 120 heat sink; |
| 121 lens array; | 122 groove; |

DETAILED DESCRIPTION OF THE PREFERRED EMBODIMENTS

Hereinafter, the present invention will be further described in detail with reference to the accompanying drawings.

The present invention provides a method for aligning and bonding a lens array 121 to a PD array 118 with high precision, which utilizes the automatic image processing technique to find centers, and has features such as high precision, good repeatability, high degree of automation, and the like. The method is also applicable for bonding alignment of the lens array 121 with a laser array.

In the patent application No. 201310433022.2 entitled "optical waveguide chip and PD array lens coupling device", a coupling structure of a waveguide chip and the PD array 118 uses the lens array 121 to converge light signals. The present invention takes a bonding structure of the lens array 121 and the PD array 118 as an example and explains how to use the automatic image processing technique to implement the high-precision bonding alignment of the lens array 121 with the PD array 118. In the above patent application, a heat sink 120 is disposed on a cassette 117, and the PD array 118 is attached onto the heat sink 120 with conductive adhesive, On the heat sink 120 is also provided a pair of glass blocks 119, which comprises a combination of two glass blocks positioned on both sides of the PD array 118, respectively. The pair of glass blocks 119 has a height designed by preliminary optical simulation, which ensures that when the lens array 121 is placed on the pair of glass blocks 119, a light spot can be focused onto a photosensitive area of the PD array 118.

Figure 3:
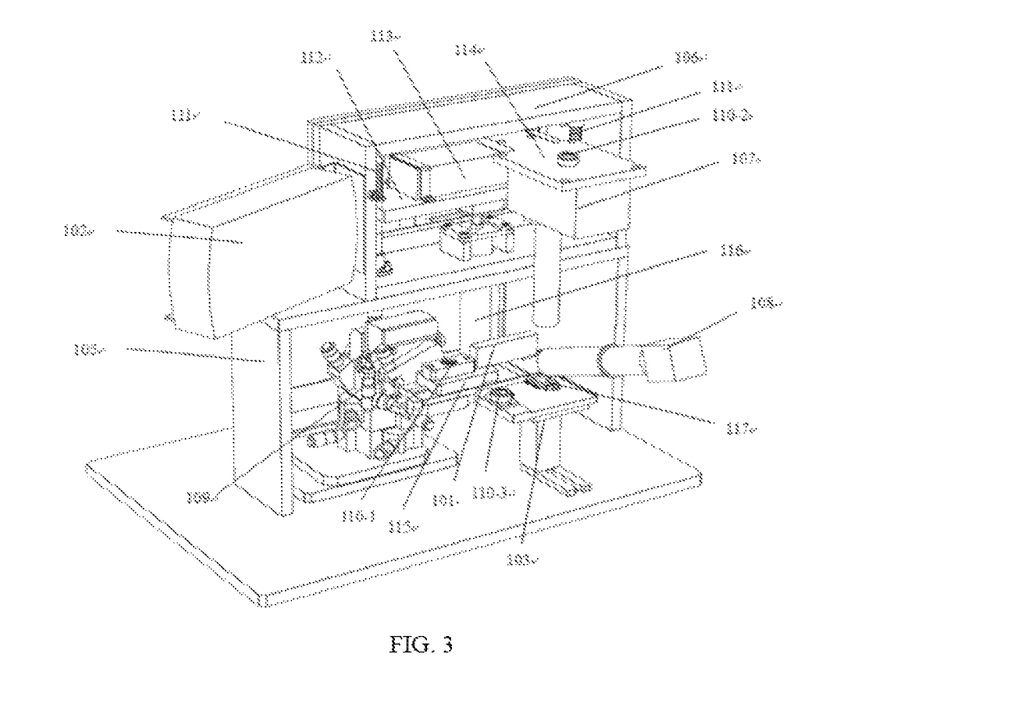
FIG. 3 is a schematic diagram showing structure of the high precision lens array bonding device according to the present invention.

The aligning bonding device mainly comprises: a cassette holding fixture 103, a lens array holding fixture 104, a gantry 105, a securing frame 106, an image acquisition CCD 107, a standard CCD 108, a high-resolution adjustment stage 109, a pressure sensor 101 and controller 102, a first bubble level 110-1, a second bubble level 110-2, a third bubble level 110-3, a slide 111, a slide platform 112, a one-axis linear stage 113, a connecting plate 114, a transition block 115, and a stepping actuator 116. As shown in FIG. 3, the high-resolution adjustment stage 109 is fixed on a pedestal of the gantry 105, the transition block 115 is fixed on the high-resolution adjustment stage 109, the first bubble level 110-1 is provided on the transition block 115, one end of the pressure sensor 101 is provided on the transition block 115, and the other end of the pressure sensor 101 is connected to the lens array holding fixture 104. The securing frame 106 is fixed on the gantry 105, two slides 111 are provided within the securing frame 106, and the slides 111 are embedded in the slide platform 112. The one-axis linear stage 113 is provided on the slide platform 112, a rear surface of the image acquisition CCD 107 is fixed on the connecting plate 114, the connecting plate 114 is fixed on the one-axis linear stage 113, and a rear surface of the connecting plate 114 is provided with the second bubble level 110-2. The stepping actuator 116 is positioned below the securing frame 106 supporting the slide platform 112, and it can move the entire slide platform 112 up and down along the slide 111 in the aligning process. The cassette holding fixture 103 is positioned under the image acquisition CCD 107 for fixing the cassette 117, and the third bubble level 110-3 is provided on the cassette holding fixture 103. The standard CCD 108 is positioned at a side of the cassette holding fixture 103, and it observes interior of the cassette 117 at a certain angle for preliminary positioning of the lens array 121. The controller 102 is connected to the pressure sensor 101 through a cable, supplies power to the pressure sensor 101, and reads pressure voltage signals fed back from the pressure sensor 101. The controller 102 converts the voltage to a pressure value to display on a screen connected to the controller 102 so as to detect magnitude of pressure between the lens array 121 and the pair of glass blocks 119 when they are in contact with each other.

Figure 5:
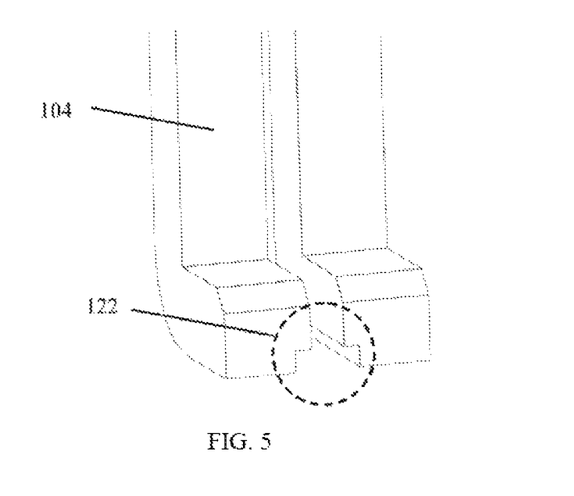
FIG. 5 is a schematic diagram showing an end portion of the lens holding fixture according to the present invention.

The lens array holding fixture 104 includes two arms having end holding portions provided with grooves 122 for positioning the lens array to be held. The lens array holding fixture 104 is not shown in FIG. 3 as it is blocked, while it is shown in FIG. 5. The grooves 122 designed for the end holding portions of the two arms of the lens array holding fixture 104 serves for a position restricting function that the lens array 121 may be pressed against the grooves 122 so as to maintain the lens array 121 in a horizontal status when it is being held.

In the device of the present invention, the one-axis linear stage 113 is used to move the image acquisition CCD 107 leftwards and rightwards, which facilitate moving to a side of a first lens array to implement bonding of a second lens array after completing bonding of the first lens array in the cassette.

A process of bonding the lens array 121 using the automatic image processing according to the present invention will be described with reference to FIG. 3.

Step 1: a rotation dimension of the high-resolution adjustment stage 109 is adjusted while observing bubble position in the first bubble level 110-1 on the transition block 115 to adjust the bubble into a central circle, and make sure that bubbles in the third bubble level 110-3 on the cassette holding fixture 103 and the second bubble level 110-2 on the rear surface of the connecting plate 114 both are in a central circle.

Figure 6:
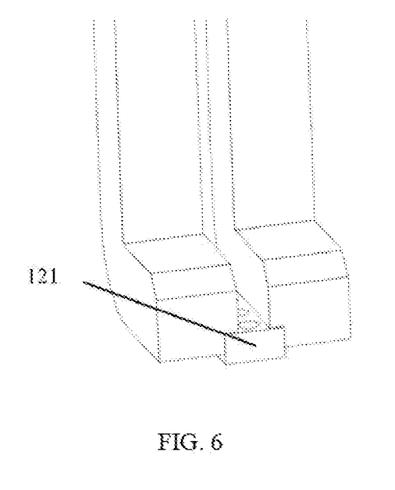
FIG. 6 is a schematic diagram showing the end portion after holding the lens array according to the present invention.

Step 2: the lens array 121 is held in position. As shown in FIG. 5 and FIG. 6, the lens array 121 is placed in the grooves 122 at the end portions of the lens array holding fixture 104 so that an upper surface of the lens array 121 is pressed against the top of the groove 122.

Figure 4:
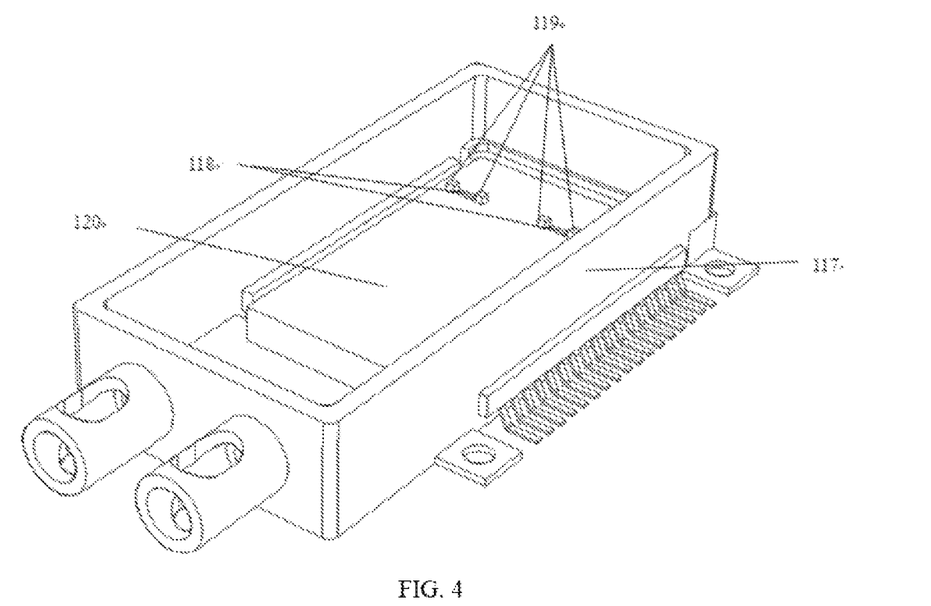
FIG. 4 is a schematic diagram showing the lens array to be attached inside the cassette in the present invention.

Step 3: the cassette 117 to be aligned is positioned over the cassette holding fixture 103, as shown in FIG. 4. The position of the image acquisition CCD 107 may be adjusted so that the PD array 118 forms an image at the center of the field of view. The position of the standard CCD 108 may be adjusted so as to be able to observe the pair of glass blocks 119 and the PD array 118 in the cassette 117.

Step 4: the high-resolution adjustment stage 109 is adjusted while observing position of the lens array 121 relative to the pair of glass blocks 119 through the standard CCD 108, so as to move the lens array 121 directly above the PD array 118. An up and down adjustment dimension of the high-resolution adjustment stage 109 is adjusted to gradually move the lens array 121 downwards, and meanwhile pressure value outputted from the controller 102 of the pressure sensor 101 is observed. When the pressure value of the controller 102 changes, the high-resolution adjustment stage 109 stops moving downwards, and the lens array 121 and the pair of glass blocks 119 are just in contact with each other at this point. In this step, change of pressure value measured by the pressure sensor 101 is read to make the lens array just be in contact with the pair of glass blocks, thereby determining the height dimension of the lens array.

Step 5: a position of a telescopic rod of the stepping actuator 116 is adjusted to move the image acquisition CCD 107 up and down, until the photosensitive area of the PD array 118 can be observed clearly. At this point, the photosensitive area of the PD array 118 forms an image on the image acquisition CCD 107 through the lens array 121. The position of the telescopic rod of the stepping actuator 116 is recorded as h1. When the PD array 118 forms a clear image, an image is acquired and position coordinate of center of each circular photosensitive area of the PD array 118 in the image is calculated by using an image processing software (recorded as x1, y1; x2, y2; . . . ; xn, yn, in unit of micrometer). A coordinate of the n-th point is represented as (xn,yn), and these numerical values are recorded. A slope k1 of a line connecting the centers of the photosensitive areas are also calculated at this time.

Step 6: the position of the telescopic rod of the stepping actuator 116 is adjusted again until the lens array 121 forms a clear image in the field of view of the image acquisition CCD 107, and the position of the telescopic rod of the stepping actuator 116 at this point is recorded as h2. An image is acquired, and position coordinates of centers of the apertures of the lens array 121 corresponding to the PD array are calculated by using the image processing software (recorded as x'1, y'1; x'2, y'2; . . . ; x'n, y'n, in unit of micrometer). The coordinate of the n-th point is recorded as (x'n, y'n), and these numerical values are recorded. A slope k2 of a line connecting the centers of the apertures of the lens array 121 is also calculated at this time.

Figure 2:
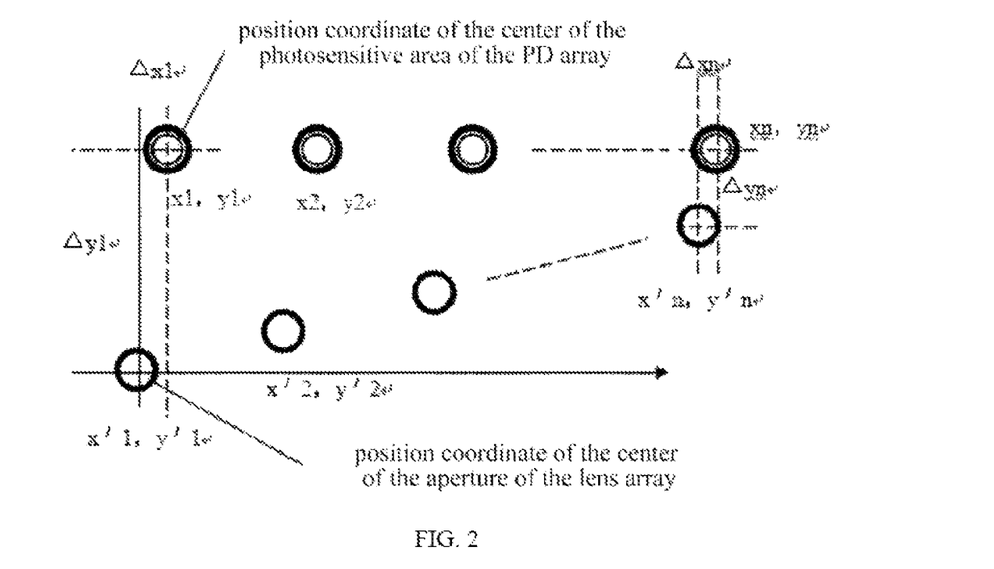
FIG. 2 is a schematic diagram showing position coordinates of centers of photosensitive areas of the PD array and centers of apertures of the lens array in the present invention.

Step 7: as shown in FIG. 2, difference between coordinates of the centers of the photosensitive areas and coordinates of the centers of the corresponding apertures of the lens array 121 is calculated as $\Delta x1=x1-x'1$, $\Delta y1=y1-y'1$, $\Delta xn=xn-x'n$, $\Delta yn=yn-y'n$. The high-resolution adjustment stage 109 is adjusted according to calculated values of $\Delta x1$, $\Delta y1$, $\Delta xn$, $\Delta yn$ to make the centers of the apertures of the lens array 121 be completely coincided with the centers of the photosensitive areas of the PD array 118, i.e., $\Delta x1=\Delta y1=\Delta xn=\Delta yn=0$. The values for adjustment of the high-resolution adjustment stage 109 are: arctan(k1)−arctan(k2) in unit of degree for adjustment of the rotation dimension, and $\Delta x1$ and $\Delta y1$ in unit of micrometer for adjustment in X and Y directions, respectively.

Step 8: the telescopic rod of the stepping actuator 116 is adjusted to h1 again, and the position coordinates of the centers of the circular photosensitive areas in the image are calculated as in Step 5. The telescopic rod of the stepping actuator 116 is adjusted to h2 again, and the position coordinates of the centers of the apertures of the corresponding lens array 121 are calculated as in Step 6. The distances between every two corresponding centers and the slopes of the centers are calculated as in Step 7. The photosensitive areas of the PD array 118 are completely aligned to the lens array 121 when $\Delta x1=\Delta y1=\Delta xn=\Delta yn=0$ and k1=k2. If any one of $\Delta x1$, $\Delta y1$, $\Delta xn$, $\Delta yn$ is not zero, Steps 5, 6 and 7 are repeated until $\Delta x1=\Delta y1=\Delta xn=\Delta yn=0$.

A way of adjusting the fine adjustment shelf after coordinates of both centers are calculated by the image processing system will be described by way of example. Assuming x1=200, y1=200, xn=950, yn=950; x'1=150, y'1=150, x'n=799.5, y'n=525 (in unit of millimeter); the image processing system calculates k1=0, k2=0.577. Angle and position for the adjustment are calculated as: arctan(0)−arctan(0.577)=−30 degrees for the adjustment angle, $\Delta x1=x1-x'1=+50$ μm, and $\Delta y1=y1-y'1=+50$ μm for the adjustment position; Thus, the fine adjustment shelf may be adjusted in a way that it rotates 30 degrees in a negative rotation direction, and moves 50 μm in the X direction and 50 μm in the Y direction.

Step 9: when $\Delta x1=\Delta y1=\Delta xn=\Delta yn=0$ and k1=k2, adhesive agent is applied and cured to bond the lens array 121 onto the pair of glass blocks 119. Thus, the bonding is completed, and the lens array holding fixture 104 may be removed.

Step 10: after bonding of the lens array 121 is completed, the one-axis linear stage 113 may be adjusted to move until the image acquisition CCD 107 fixed on the one-axis linear stage 113 through the connecting plate 114 moves directly above another PD array 118. Steps 2 to 9 may be repeated to complete bonding of the another PD array 118.

In Step 1, the three bubble levels function to ensure that the cassette holding fixture 103 and the lens array holding fixture 104 are in a horizontal plane, and the image acquisition CCD 107 observes the PD array 118 and lens array 121 perpendicular to the horizontal plane, which prevents the image acquisition CCD 107 from left or right displacement at the time of acquiring images at heights of h1 and h2 and thus generating systematic error in calculating of $\Delta xn$ and $\Delta yn$.

In Step 2: the lens array holding fixture 104 is designed with grooves to, with the position restricting function of the grooves, hold the lens array 121 against the grooves. Thus, it is able to maintain the lens array 121 in a horizontal status while being held, as shown in FIG. 5 and FIG. 6.

In Steps 3 and 4, the lens array 121 is preliminarily adjusted to move over the PD array 118 by using the standard CCD 108 with a large field of view. Then the pressure sensor 101 is used to determine the position where the lens array 121 and pair of glass blocks 119 just come into contact with each other, thereby achieving a coarse alignment adjusting the lens array above the PD array. In Steps 5 and 6, the image acquisition CCD 107 is moved by the stepping actuator 116 to two heights and acquires images of the PD array 118 and the lens array 121 at the two heights. This is because that the photosensitive area of the PD array 118 has a height different from that of the lens array 121, and the depth of field of the image acquisition CCD 107 too short to image both the PD array 118 and the lens array 121 at the same time. So, the PD array 118 and the lens array 121 need to be imaged respectively after adjusting the image acquisition CCD 107 up and down.

In Step 7, $\Delta x1$, $\Delta y1$, $\Delta xn$ and $\Delta yn$ are calculated, obtaining a specific adjusting scheme. Then, the high-resolution adjustment stage 109 is adjusted to make the center of each photosensitive area of the PD array 118 be coincided with the center of the corresponding aperture of the lens array 121, which can ensure a maximal coupling efficiency and tolerance. In operation, the adjustment may be based only on the first and last pairs of data, because the PD array 118 has the same interval as the lens array 121 and the PDs correspond one by one to the lenses so that when the first and last photosensitive areas of the PD array 118 coincide with the first and last apertures of the lens array 121, the intermediate ones also coincide with each other.

Figure 1:
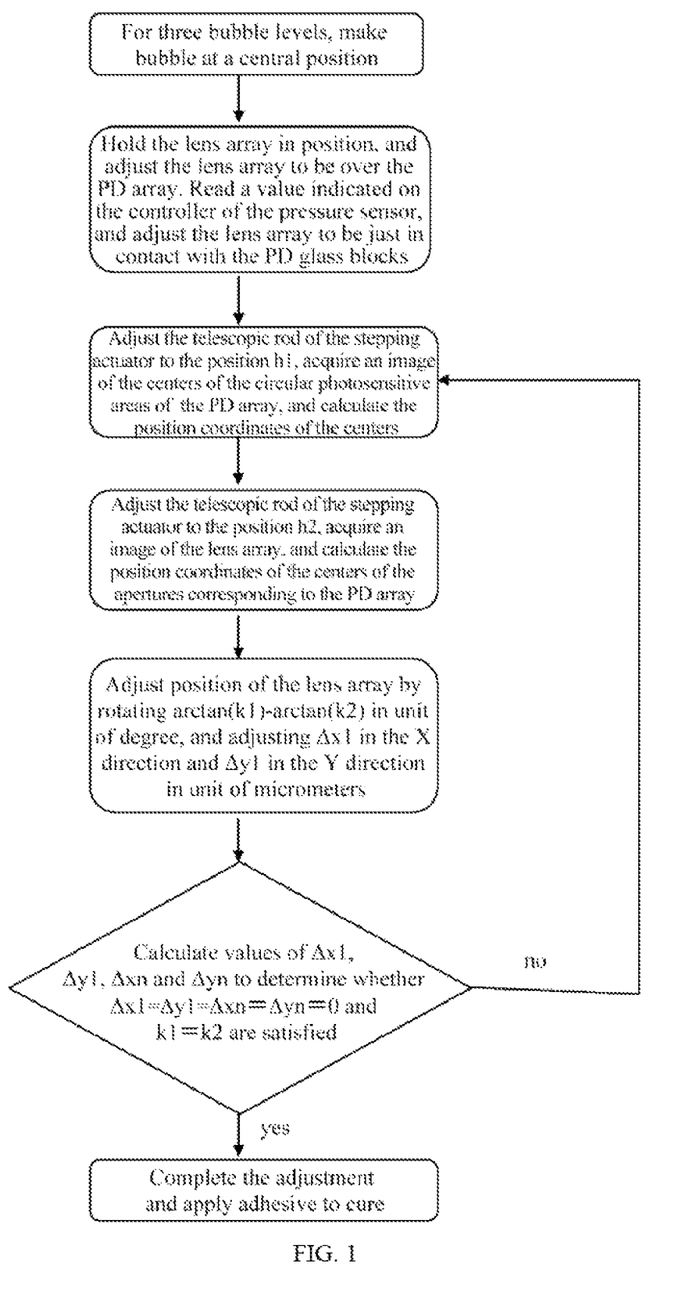
FIG. 1 is a flow chart of a method for bonding a lens array according to the present invention.

In Step 8, an internal loop of detecting—position deciding—adjusting—re-detecting is formed with Steps 5, 6 and 7 to ensure the precision and repeatability of bonding of the lens array. The flow chart is shown in FIG. 1.

The present invention acquires images of the PD array 118 and the lens array 121 respectively, and identifies their centers and calculates differences of every two centers using an automatic center recognizing function of the image processing method, thereby providing a numerical basis for position adjustment in high-precision bonding of the lens array 121. When the center of the photosensitive area of the PD and the center of the aperture of the lens both are on the optical axis at the same time, the maximal coupling efficiency and coupling tolerance may be ensured. Especially for a high speed PD array having a smaller photosensitive area, it is more important to ensure both centers simultaneously on the optical axis.

The present invention provides a method for bonding (adhering) of the lens array with the PD or laser array, which is also applicable to coupling between a single lens and a single PD or laser. For coupling between the single lens and the single PD or laser, the upper surface of the PD/laser and the upper surface of the lens are also imaged by the above two image acquisition steps, coordinates x1 and y1 of the centers of the circular photosensitive areas of the PD (center of the laser waveguide) are calculated; coordinates x'1, y'1 of the center of the aperture of the lens are calculated; a difference therebetween is calculated: $\Delta x1=x1-x'1$, Δy1=y1−y'1, thereby obtaining an adjusting scheme for the high-resolution adjustment stage.

The method of the present invention may adjust the high-resolution adjustment stage in a manual mode or in an automatic control mode until the centers of the apertures of the lens array are coincided with the centers of the photosensitive areas of the PD array. In the manual mode, the adjusting scheme for the high-resolution adjustment stage may be conducted by hand based on the coordinate difference between the centers of the photosensitive areas of the PD array and the corresponding centers of the apertures of the lens array and the calculated value of arctan(k1)−arctan(k2). In the automatic control mode, the adjusting scheme for the high-resolution adjustment stage may be conducted using an automatic control method.

The present invention utilizes the image processing method to calculate positions of the centers of the apertures of the lens array and the centers of the photosensitive areas of the PD array. By designing an appropriate magnification factor, a position accuracy of the centers may reach a micrometer level. Through process design, it is able to calculate position and position/slope difference of the centers of the lens array and the PD array first, and then adjust the position of the lens array and calculate the position/slope difference again, and then adjust once more until positions of the centers are completely coincided with each other. Thus, an internal loop of deciding—adjusting—re-deciding is implemented, which ensures the high precision adhering (bonding) of the lens, has a good repeatability, and simplifies requirement of the adhering (bonding) of the lens array on human-eyes decision.

The above-described embodiments are only preferred embodiments provided for sufficiently explaining the present invention, and the range sought for protection by the present invention is not limited thereto. Equivalent replacements or variations made by those skilled in the art based on the present invention all fall into the scope sought for protection by the present invention. The range sought for protection by the present invention is based on the claims.

The invention claimed is:

1. An aligning bonding device for aligning a lens array to a PD array with high precision, comprising: a cassette holding fixture (103), a lens array holding fixture (104), a gantry (105), a securing frame (106), an image acquisition CCD (107), a high-resolution adjustment stage (109), a first bubble level (110-1), a second bubble level (110-2), a third bubble level (110-3), a slide (111), a slide platform (112), a one-axis linear stage (113), a connecting plate (114), a transition block (115), and a stepping actuator (116), wherein the high-resolution adjustment stage (109) is fixed on a pedestal of the gantry (105), the transition block (115) is fixed on the high-resolution adjustment stage (109), the first bubble level (110-1) is provided on the transition block (115), the securing frame (106) is fixed on the gantry (105), the slide (111) is provided within the securing frame (106), the slide (111) is embedded in the slide platform (112), the one-axis linear stage (113) is provided on the slide platform (112), a rear surface of the image acquisition CCD (107) is fixed on the connecting plate (114), the connecting plate (114) is fixed on the one-axis linear stage (113), a rear surface of the connecting plate (114) is provided with the second bubble level (110-2), the stepping actuator (116) is positioned below the securing frame (106) supporting the slide platform (112), the stepping actuator (116) functions to move the slide platform (112) up and down along the slide (111), the cassette holding fixture (103) is positioned under the image acquisition CCD (107), and the third bubble level (110-3) is provided on the cassette holding fixture (103).

2. The aligning bonding device for aligning a lens array to a PD array with high precision of claim 1, further comprising a pressure sensor (101), one end of which is provided on the transition block (115), and the other end is connected to the lens array holding fixture (104).

3. The aligning bonding device for aligning a lens array to a PD array with high precision of claim 1, further comprising a standard CCD (108) provided at a side of the cassette holding fixture (104) to observe interior of the cassette (117).

4. The aligning bonding device for aligning a lens array to a PD array with high precision of claim 3, wherein the lens array holding fixture (104) includes two arms, and end holding portions of the two arms are provided with grooves.

5. The aligning bonding device for aligning a lens array to a PD array with high precision of claim 2, further comprising a controller (102) in connection with the pressure sensor (101) to read pressure voltage signal fed back from the pressure sensor (101).

6. A method for aligning a lens array to a PD array with high precision by using the aligning bonding device for aligning a lens array to a PD array with high precision of claim 1, comprising the following steps:

holding the lens array (121) with the lens array holding fixture (104);

fixing the cassette (117) to be aligned, in which the PD array (118) to be aligned and a pair of glass blocks (119) are arranged, on the cassette holding fixture (103), adjusting the image acquisition CCD (107) and the cassette (117) in which the PD array is placed to a completely parallel status so that the image acquisition CCD (107) has a shooting sight completely perpendicular to the cassette (117);

adjusting the high-resolution adjustment stage (109) to make the lens array (121) just be in contact with the pair of glass blocks (119) and determine a height dimension of the lens array (121);

adjusting a telescopic rod of the stepping actuator connected to the image acquisition CCD (107) to move the image acquisition CCD (107) up and down until photosensitive areas of the PD array form a clear image on the image acquisition CCD (107) through the lens array (121), recording an adjusted distance h1 of the telescopic rod of the stepping actuator, acquiring an image and determining a position coordinate of center of each circular photosensitive area of the PD array (118) in the image, a coordinate of the n-th point being recorded as (xn, yn), and calculating a slope k1 of a line connecting the centers of the photosensitive areas;

adjusting the telescopic rod of the stepping actuator again until the lens array (121) forms a clear image in the field of view of the image acquisition CCD (107), recording an adjusted distance h2 of the telescopic rod of the actuator, acquiring an image and determining position coordinates of centers of apertures of the lens array (121) corresponding to the PD array, a coordinate of the n-th point being recorded as (x'n, y'n), and calculating a slope k2 of a line connecting the centers of the apertures of the lens array (121);

calculating difference between the coordinates of the centers of the photosensitive areas and the coordinates of the centers of the corresponding apertures of the lens array, wherein a coordinate difference of the n-th point is recorded as Δxn=xn−x'n, Δyn=yn−y'n;

adjusting the high-resolution adjustment stage (109) to adjust position of the lens array (121) based on the calculated values Δxn, Δyn, arctan(k1)−arctan(k2), repeating the above two image acquiring steps, the calculating step and the adjusting step until the following condition is satisfied: for any point n, Δxn=Δyn=0, and k1=k2, thereby achieving coincidence of the centers of the apertures of the lens array with the centers of the photosensitive areas of the PD array.

7. The method for aligning a lens array to a PD array with high precision of claim 6, wherein a method for making the shooting sight of the image acquisition CCD (107) completely perpendicular to the cassette (117) comprises: adjusting the high-resolution adjustment stage (109) to make the transition block (115), the cassette holding fixture (103) and the connecting plate (114) be in a horizontal status as determined through the first bubble level (110-1), the second bubble level (110-2) and the third bubble level (110-3), respectively.

8. The method for aligning a lens array to a PD array with high precision of claim 6, wherein a method for adjusting the high-resolution adjustment stage (109) to make the lens array (121) and the pair of glass blocks (119) just be in contact with each other comprises: moving the lens array (121) to be over the PD array (118) while observing through the standard CCD (108), adjusting the high-resolution adjustment stage (109) to gradually move the lens array (121) downwards while observing a pressure value indicated on the pressure sensor (101) installed on the lens array holding fixture (104), and stopping moving the lens array (121) downwards when the pressure value changes.

9. The method for aligning a lens array to a PD array with high precision of claim 6, wherein the high-resolution adjustment stage is adjusted in a manual mode or in an automatic control mode until the centers of the apertures of the lens array (121) are coincided with the centers of the photosensitive areas of the PD array (118).

* * * * *